United States Patent [19]
Sibeud

[11] 3,720,934
[45] March 13, 1973

[54] PICK-UP DEVICES FOR DETECTING THE PASSAGE OF A MOVABLE MEMBER OF A SCALE ASSEMBLY OF AN APPARATUS FOR ACCURATELY MEASURING THE SPECIFIC CONSUMPTION OF INTERNAL COMBUSTION ENGINE

[75] Inventor: Jean Paul Sibeud, Lyon, France
[73] Assignee: Automobiles M. Berliet, Lyon, France
[22] Filed: June 5, 1970
[21] Appl. No.: 43,790

[30] Foreign Application Priority Data

June 6, 1969 France..........................6918802
Feb. 11, 1970 France..........................7004845

[52] U.S. Cl. ..................340/207, 340/266, 340/195, 340/211
[51] Int. Cl.......................G08c 19/12, G08c 19/06
[58] Field of Search..............340/266, 200, 195, 207

[56] References Cited

UNITED STATES PATENTS

| | | | |
|---|---|---|---|
| 2,469,744 | 5/1949 | Razek | 340/195 |
| 2,576,772 | 11/1951 | Bernet | 340/200 |
| 3,252,108 | 5/1966 | Gregory | 340/200 |
| 3,461,400 | 8/1969 | Koda | 340/266 |
| 2,387,496 | 10/1945 | Cornelius | 340/200 |

Primary Examiner—Thomas B. Habecker
Attorney—Stevens, Davis, Miller and Mosher

[57] ABSTRACT

A pick-up device, used with a scale having a pointer movable in front of a dial, the measuring scale carrying a plurality of pick-ups, which comprises a transistorized circuit with a frequency modulated inductance-capacitance circuit, an impedance changer with a quartz filter to which it transmits the oscillator signal, an impedance changer interposed between said filter and an amplifier stage, and transmitting to said stage only the signals generated by said oscillator which correspond to the inherent frequency of quartz, a signal detector rectifying through a doubler the HF voltage having passed through said quartz filter and amplified through said amplifier, and a shaping device for delivering at a low impedance value a high-amplitude logic signal.

2 Claims, 6 Drawing Figures

PICK-UP DEVICES FOR DETECTING THE PASSAGE OF A MOVABLE MEMBER OF A SCALE ASSEMBLY OF AN APPARATUS FOR ACCURATELY MEASURING THE SPECIFIC CONSUMPTION OF INTERNAL COMBUSTION ENGINE

This invention relates to a device for measuring the specific fuel consumption, on a power-to-weight ratio, of internal combustion engines.

In a former patent in U.S. Pat. No. 3,448,609 of June 10, 1969, the Applicant describes a measuring device comprising an automatic scale adapted to weigh the consumed fuel contained in the measuring tank carried by the tray of this scale; the scale pointer is adapted, as it moves, to control the transmission of signals controlling in turn on the one hand the filling of said tank and on the other hand, during a uniform movement of the scale, the counting of the number of revolutions per minute of the engine and the time required for consuming a predetermined quantity of fuel.

In this device the scale dial carries twin-coil electromagnetic pick-ups adapted to create a field intersected by a metal plate secured normally to the scale pointer, the signals emitted by these pick-ups being received by electronic devices controlling the electromagnetic valve relay and revolution counters.

Hitherto known electromagnetic pick-ups utilized in this measuring system, as well as pick-ups of the mutual-induction variation type, of the photoelectric type and others used in different measuring systems are objectionable on account of their limited precision and stability, and require an extremely accurate mechanical construction, thus increasing their cost.

It is the essential object of the present invention to provide a device for accurately measuring the specific consumption of internal combustion engines which utilizes pick-up or like means for detecting the passage of the movable member and permits of attaining an extremely high degree of precision in the detection of the passage of the scale pointer, even at a high passage speed, without exerting any appreciable mechanical effect on the movable member to be detected, while being relatively easy and economical to manufacture.

A first form of embodiment of this device for making accurate measurements is characterized in that the dial of the measuring scale is provided with pick-up means comprising, in combination, a transistorized oscillator having an inductance-capacitance circuit adapted to be frequency modulated by causing a variation in one component element of this circuit, a first impedance changer associated with a quartz filter and transmitting to said quartz filter the signal received from said oscillator, a second impedance changer interposed between said filter and an amplifying stage, and transmitting to said amplifying stage only the signals generated by said oscillator which correspond to the inherent frequency of said quartz, a signal detector adapted to rectify through a doubler the HF voltage having passed through said quartz filter, and a shaping device for delivering at low impedance a high-amplitude logic signal.

The oscillation frequency of an inductance-capacity circuit is calculated according to the formula $f = 1/(2\pi\sqrt{LC})$ wherein $L$ is the inductance value and $C$ the capacity value.

Therefore, the frequency $f$ may be varied by modifying either $L$ or $C$.

The movable member of which it is desired to detect the passage through a given position may cause variations either in the inductance or in the capacitance, as desired.

A quartz filter is extremely selective and the signals transmitted from a sustained oscillator controlled by the $LC$ circuit can pass through such a filter only when their respective frequencies are concordant. A signal detector displays with an information (0) the absence of signals passing through the filter and with an information (1) the presence of signals passing through this filter.

A second form of embodiment of the device for making accurate measurements is characterized in that the pick-ups, consisting as in the first form of embodiment of transistorized oscillators having a frequency-modulated inductance-capacitance circuit, are remotely connected to at least one electronic detector comprising in cascade a frequency changer, a low-frequency low-pass filter, a detector consisting of a voltage doubler circuit, and a device for shaping the output logic signal, and that the frequency-changer assembly of the device is connected to a local transistorized oscillator adapted to emit a signal at a predetermined fixed frequency, each frequency changer transmitting to its filter a signal representing the difference between said fixed frequency of said local oscillator and the variable frequency of the signal emitted by said pick-up.

The output of the frequency changer may consist of a signal containing the sum of the two frequencies ($f_0 + f_1$) or their difference ($f_0 - f_1$), $f_0$ designating the oscillator signal frequency and $f_1$ the frequency of the signal produced by the variable frequency pick-up.

By selecting a central frequency $F$ of the low-frequency filter which is considerably lower than the frequencies $f_0$ and $f_1$, only the components $f_0 - f_1$ of the signal issuing from the frequency changer are likely to have the same order of magnitude as $F$ and to pass through the filter.

If $\Delta F$ is the width of the pass-band of the filter for obtaining an output signal of the low-frequency band filter, it is necessary that $$f_0 - f_1 = F \pm \tfrac{1}{2}\Delta F$$

Therefore, $f_1$ must be equal to $(f_0 - F) \pm \tfrac{1}{2}\Delta F$
The selectivity of the assembly is:

$$(\Delta f_1/f_1) = (\Delta F)/(f_0 - F)$$

Thus, assuming that $F = 1$KHz, $\Delta F = 0.3$KHz and $f_0 = 30,000$ KHz, a selectivity of about $10^{-5}$ is obtained which is higher than that of an ordinary quartz.

The device according to the present invention provides the following improvements in relation to the quartz system:

1. A higher precision of the release point;
2. a separation of the pick-up oscillator from the other parts of the electronic circuit, the connection being obtained through a coaxial cable;
3. the possibility of utilizing any frequency within the range of 1 to 100 MHz without resorting to a special quartz;
4. a simplification of the technological construction and in the adjustment thereof;
5. an improved temperature resistance;

6. a lower cost;
7. the possibility of switching by means of simple relays different pick-ups to a same detector device.

In order to afford a clearer understanding of this invention two typical forms of embodiment thereof will now be described by way of example with reference to the attached drawing, in which.

Figure 1:
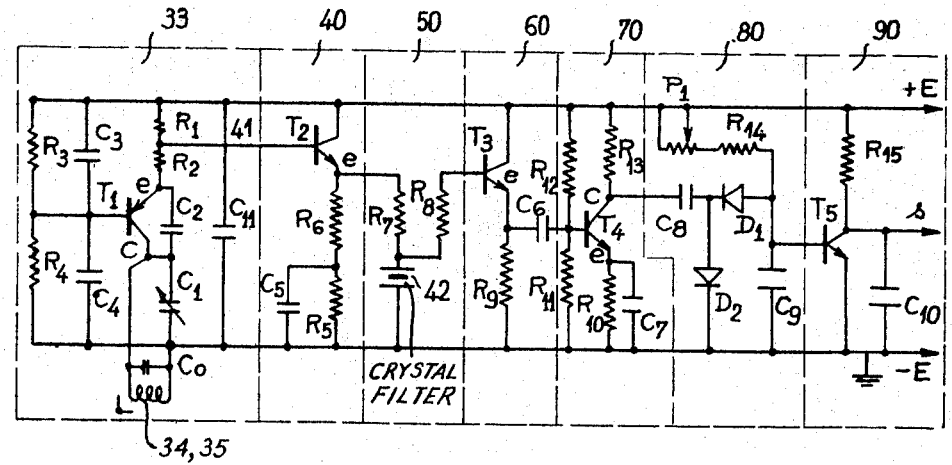
FIG. 1 illustrates the wiring diagram of the detector of this invention according to a first form of embodiment thereof.

Referring first to FIG. 1, it will be seen that the detector comprises firstly an oscillator 33 (enclosed in the dash line frame in the figure) comprising an inductance coil L, a fixed high-stability silver-plated mica capacitor $C_0$ mounted in parallel with the coil L, an adjustable air-capacitor $C_1$ in series with the L–$C_0$ circuit, a transistor $T_1$ for example of the PNP type, a capacitor $C_2$ between the emitter $e$ and collector $c$ of said transistor, a capacitor $C_3$ in parallel with a resistor $R_3$ between the + terminal of the power supply E and the base of transistor $T_1$, a capacitor $C_4$ in parallel with a resistor $R_4$ between the grounded-terminal and the same base, another capacitor $C_{11}$ between terminals + and −, and resistors $R_1$ and $R_2$ in series, connected across the − terminal and the emitter $e$. The oscillating circuit L,$C_0$,$C_1$ is connected to the collector $c$ of transistor $T_1$. The adjustable capacitor $C_1$ permits of presetting the oscillation release point. The elements $R_1$, $R_2$, $R_3$, $R_4$, $C_3$, $C_4$ constitute the biasing circuits of transistor $T_1$ provided for de-energizing the oscillating circuit. The feedback capacitor $C_2$ of the high-stability type is connected directly to the oscillating circuit.

Figure 2:
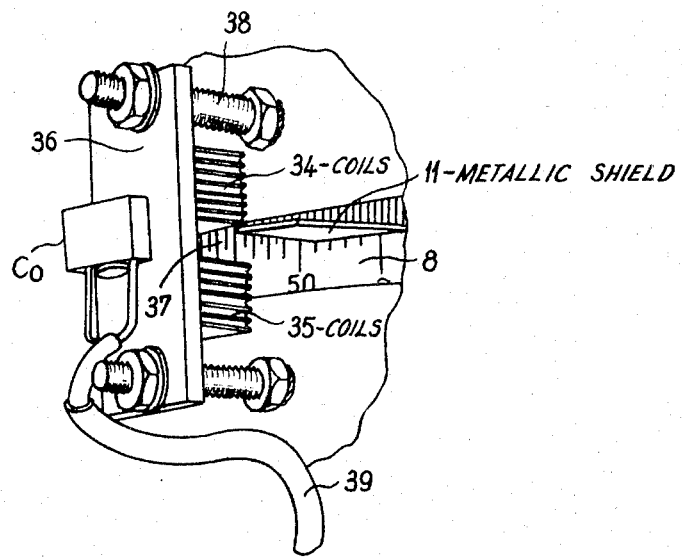
FIG. 2 shows in perspective the position of the oscillating circuit of the detector of FIG. 1 in relation to the movable metal plate rigid with the scale pointer.

The detector of this example is of the variable inductance type. Its inductance coil L, as shown in FIG. 2, consists of a pair of magnetically coupled half-coils 34, 35 mounted on an insulating plate 36 so as to have a common axis and provide an axial gap 37 between the two half-coils. This insulating plate 36 is secured by means of screw-threaded rods 38 to the frame structure of the scale, so that the metal plate 11 rigid with the movable pointer of the scale can pass through said gap 37 between the two coils in front of the scale dial 8.

When the plate 11 is remote from the coils, an inductance $$L = L_1 + L_2 + m_1 + m_2$$

is obtained, wherein $L_1$ and $L_2$ designate the inductances of said half-coils, respectively; $m_1$, $m_2$ designate the mutual inductances of each half-coil, respectively.

When the shield-forming movable plate 11 is positioned in the gap formed between the two half-coils, $m_1$ and $m_2$ tend to assume a zero value. Therefore, the inductance L is subordinate to the position of the movable shield 11 in a zone spaced ±7 to 10 mm from the common axis of the half-coils $L_1$ and $L_2$.

The capacitor $C_0$ is also mounted on the insulating plate 36; a high-frequency cable 39 connects the pick-up inductance L–$C_0$ to the next portion of the detector circuit.

The signal emitted by oscillator 33 is transmitted via a connecting wire 41 between resistors $R_1$ and $R_2$ to the base of a NPN-type transistor $T_2$ of a first impedance changer 40 comprising furthermore two resistors $R_6$ and $R_5$, and a capacitor $C_5$ connected between the emitter $e$ of transistor $T_2$ and the grounded − terminal. The function of this impedance changer is to prevent the variable impedance of a quartz filter 50 from acting upon the oscillator 33.

This filter consists of a quartz 42 vibrating on its fundamental mode and resistors $R_7$ and $R_8$, and is connected to the emitter $e$ of transistor $T_2$ of the impedance changer 40. The function of this filter is to permit the passage of the signals generated by oscillator 33 only when they correspond to the inherent frequency of quartz 42.

The quartz-filtered signal is transmitted to the base of another transistor $T_3$ incorporated in a second impedance changer 60 further comprising a resistor $R_9$ and a capacitor $C_6$ connected to said last-named emitter $e$. This second impedance changer is provided for preventing the damping of the quartz which might be caused by taking the power necessary for energizing the next stage.

The stage 70 is an amplifier having the function of raising the signals having passed through the quartz filter and the impedance changer to a power level sufficient for ensuring a proper detection.

The amplifier consists of an NPN-type transistor $T_4$ receiving the signal at its base, of resistors $R_{11}$ and $R_{12}$ constituting the biasing divider, of a resistor $R_{10}$ for compensating the emitter $e$ with a capacitor $C_7$, a ballast resistor $R_{13}$ and a connecting capacitor $C_8$ connected to collector $c$.

The collector $c$ transmits the signal to a detector 80 designed for rectifying through a voltage doubler the HF-voltage transmitted by the preceding stage 70 in order to permit the actuation of the next stage. This detector comprises a pair of diodes $D_1$ and $D_2$, a potentiometer $P_1$ in series with a resistor $R_{14}$, and a capacitor $C_9$. The role of this potentiometer is to adjust the biasing current of the next stage as a function of its current gain.

The last stage 90 or shaping stage is adapted to deliver at low impedance a high-amplitude signal. It comprises an NPN-type transistor $T_5$, a ballast resistor $R_{15}$ and a capacitor $C_{10}$. The signal output $s$ is obtained from the collector $c$ of transistor $T_5$.

The detector circuits assembly is formed as a printed circuit either individually if it is desired to use a single detector separately, or on a common plate comprising other circuit elements, as in the case of the automatic scale measuring device.

Figure 3:
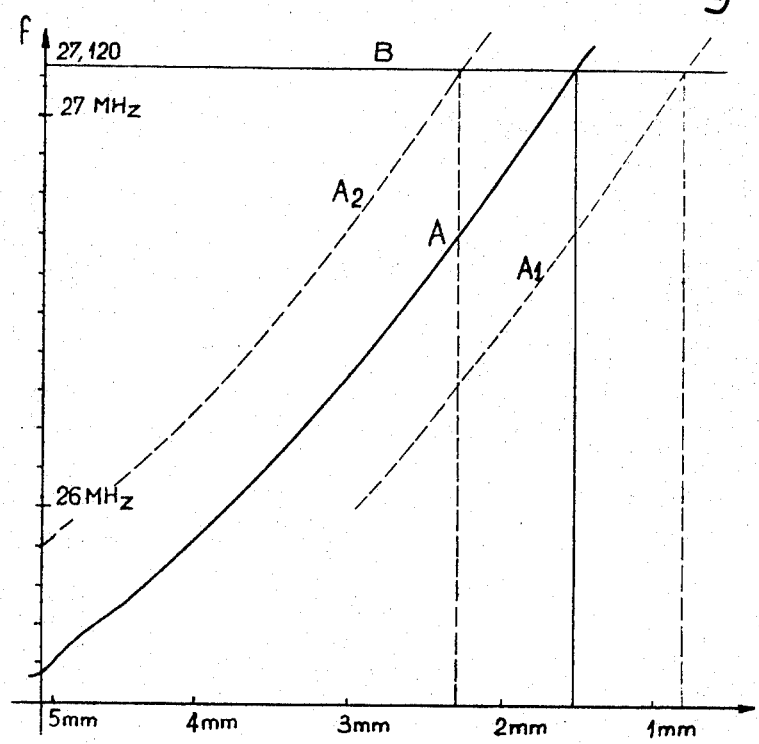
FIG. 3 illustrates the diagram of the curves plotting the oscillation frequency as a function of the displacement of the metal plate carried by the movable member.

The diagram of FIG. 3 shows the variation of the frequency produced by the oscillator 33 as a function of the movement of the movable shield 11 in relation to the axis of the pair of half-coils 34, 35. In this diagram the distance between the shield 11 and the coil axis is plotted in abscissa and the signal frequency (MHz) is plotted in ordinates.

The thick-line curve A denotes the frequency variation for a constant value $C_1$ of the tuning capacitor. The intersection of this curve A with a straight line B representing the pass-band frequency (27.120 MHz) of the quartz utilized (the thickness of the straight line corresponds to the pass-band of the quartz filter) shows that the position impulse will be emitted for a position between 1 and 2 mm.

The dash line curves $A_1$ and $A_2$ obtained by varying the capacitor $C$ by $+\Delta C$ or $-\Delta C$, respectively, produce releases at different positions, about 1 mm for the first curve and between 2 and 3 mm for the other curve.

The accurate adjustment of the release point is therefore extremely simple and consists in effecting the micrometric adjustment of a simple air-type variable capacitor, without using any device pertaining to the field of precision mechanics as currently found in other systems.

Figure 4:
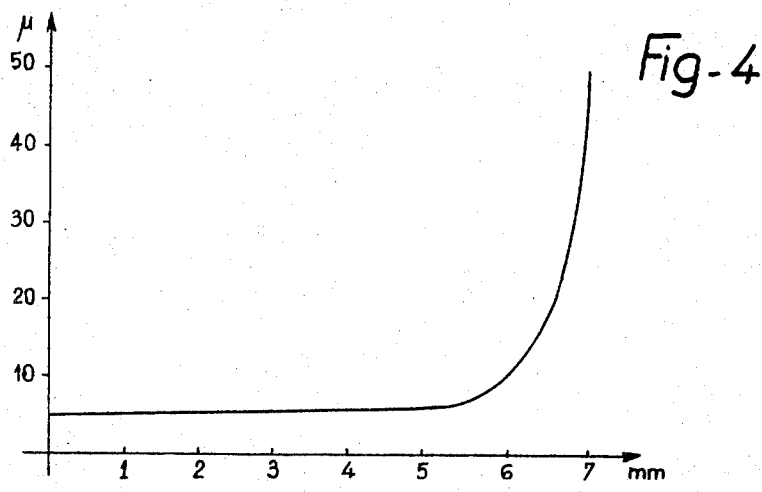
FIG. 4 illustrates a curve showing the precision of the detection according to the position of the release point in relation to the axis of the pick-up coil.

In the curve of FIG. 4, the ordinate designates the movement, in micrometers, of the movable shield 11, which is necessary for causing the output signal $s$ to pass from $0 \rightarrow 1$, or, conversely, from $1 \rightarrow 0$, according to the direction of the movement about a same mean point. The abscissa denotes in mm the distance from the mean point of screen 11 to the axis of half-coils 34, 35 when the signal is released.

It will be noted that the adjustment of the variable capacitor $C$ permits of adjusting the release point within a zone of $\pm 5$ mm about the coil axis while preserving a release uncertainty of only $\pm 2$ or 3 micrometers.

It may also be noted that the detector has a good thermal stability during operation; in a temperature range of from $-20°$ to $+80°C$, the release point discrepancy is less than 10 micrometers.

Figure 5:
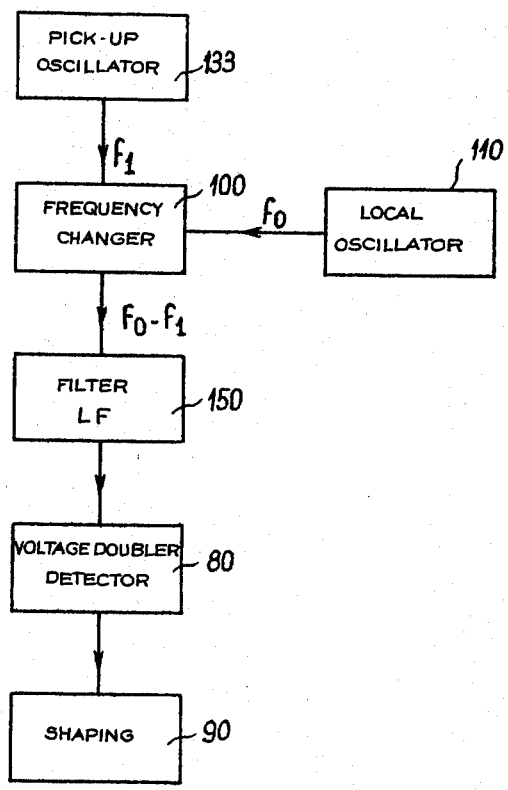
FIG. 5 illustrates the block diagram of the complete detector assembly according to a second form of embodiment of this invention.
Figure 6:
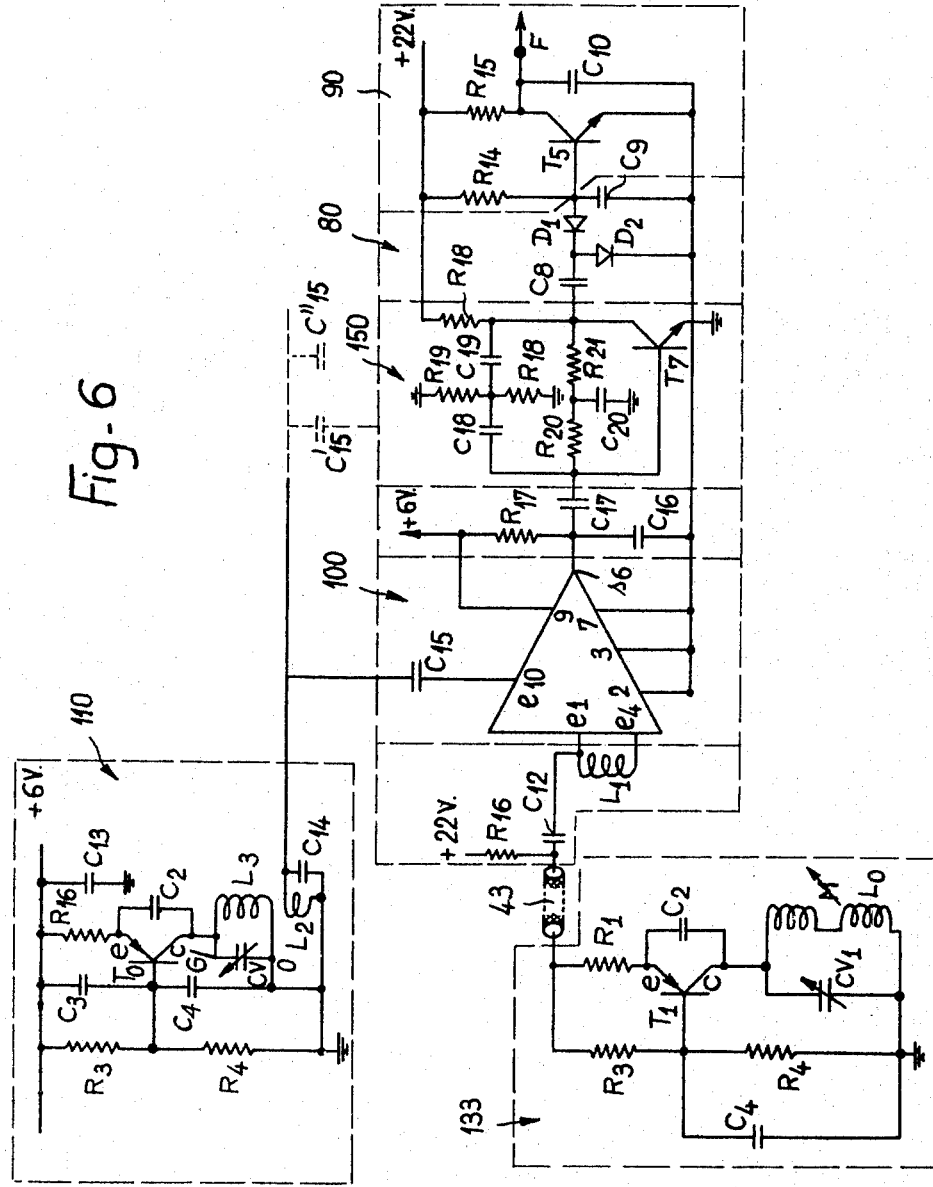
FIG. 6 illustrates the wiring diagram of the assembly of FIG. 5.

In a second form of embodiment of this detector as illustrated in FIGS. 5 and 6, it will be seen that a pick-up oscillator 133 mounted on the dial (not shown) of the measuring scale is connected via a coaxial cable 43 to an electronic detector assembly comprising in succession, advantageously assembled on a common support, a frequency-changer amplifier 100 to which a local oscillator 110 is connected, then an active filter 150 for the low band-pass frequency, a voltage doubler detector circuit 80 and finally a stage 90 for shaping the high-amplitude logic signal delivered at a low impedance.

The pick-up oscillator 133 comprises as already known per se an inductance coil $L_0$ consisting of two half-coils, a variable air-type capacitor $C_1$ mounted in parallel with said inductance coil $L_0$ and forming therewith the oscillating circuit connected to the collector $c$ of a PNP-type transistor $T_1$ mounted with a common base, a feedback capacitor $C_2$ between the emitter $e$ and collector $c$ of said transistor, a ballast resistor $R_1$, a biasing and by-pass circuit consisting of a pair of resistors $R_3$ and $R_4$ with a capacitor $C_4$ across the terminals of resistor $R_4$. The pick-up oscillator is energized from a +22-Volt source via a coaxial cable 43 through a resistor $R_{16}$. The common points of resistor $R_4$, capacitor $C_4$, variable capacitor $CV_1$ and inductance coil $L_0$ are grounded.

During the variations of its inductance coil $L_0$ the pick-up oscillator 133 emits a signal having a frequency $f_1$, for example of less than 30 MHz. This signal is directed via cable 43 through a capacitor $C_{12}$ connected to a reactor $L_1$ so as to be displayed at the inputs $e_1$ and $e_4$ of the frequency-changer amplifier 100 of the integrated circuit type.

As the pick-up circuit 133 is independent of the other elements of the detector assembly, a plurality of pick-ups in a same detector assembly can be switched by using simple electromagnetic relays (not shown in the drawing).

The local oscillator 110 comprises a transistor $T_0$ also of the PNP type, mounted on a common base. The oscillating circuit consists of a variable capacitor $CV_0$ mounted, in parallel with an inductance coil $L_3$, between the collector $c$ of transistor $T_0$ and the ground. The biasing and by-pass circuit consists of resistors $R_3$, $R_4$, and capacitors $C_3$, $C_4$. The +6-Volt power supply is directed through a ballast resistor $R_{16}$, with a capacitor $C_{13}$ connected in parallel between this resistor and the ground. A feedback capacitor $C_2$ is mounted between the collector $c$ and emitter $e$ of transistor $T_0$. The oscillator emits a signal of fixed frequency $f_0$, for example of 30 MHz, adjustable by means of the variable capacitor $CV_0$. The coupling of the oscillating circuit with the frequency changer 100 takes place through the coupling coil $L_2$ having a capacitor $C_{14}$ connected across its terminals. The common point of resistor $R_4$ and variable capacitor $CV_0$, on the one hand, and coupling coil $L_2$, on the other hand, is grounded.

The local oscillator 110 transmits a signal, say of the order of 30 MHz, through a capacitor $C_{15}$, to another input $e_{10}$ of frequency changer 100. The same oscillator may be connected to several detector circuits through capacitors $C'_{15}$, $C''_{15}$, etc....

The output $s_6$ of frequency changer circuit 100 is fed with a +6-Volt current through a resistor $R_{17}$ and is by-passed by a grounded capacitor $C_{16}$, whereby the signal resulting from the difference between $f_0$ and $f_1$ can be obtained directly. This +6-Volt supply is also connected to a terminal 9 of said frequency changer; the compensation terminals 2, 3, 7 are grounded. The frequency changer 100 is also connected to the input of the low-frequency filter through a capacitor $C_{17}$.

The low-frequency filter 150 is an active filter consisting of a selective amplifier. This amplifier comprises a NPN-type transistor $T_7$ loaded through a resistor $R_{18}$ from a +22-Volt current source. The feedback network of this filter consists of a double T bridged by a transistor $T_7$. The first T comprises two capacitors $C_{18}$ and $C_{19}$ in series, having their common point connected to resistors $R_{19}$ and $R_{20}$ having their other terminals grounded.

The detector 80 receiving the signal from the filter consists of a pair of series-connected diodes $D_1$ and $D_2$ having their common point connected in turn via a capacitor $C_8$ to the filter output. The diode $D_2$ is grounded; the other diode $D_1$ transmitting the rectified signal to the shaping stage 90 is connected to a grounded capacitor $C_9$.

This last-mentioned shaping stage 90 emitting a high-amplitude logic signal at its output F comprises an NPN-type transistor $T_5$, a ballast resistor $R_{15}$ connected to the +22-Volt current source and coupled with a capacitor $C_{10}$. Another resistor $R_{14}$ connected to the +22-Volt source, possibly in series with an adjustment potentiometer (not shown), controls the biasing of transistor $T_5$. The latter operates under the impulse condition, by being alternately conducting and saturated.

Although the above description and the accompanying drawing illustrate two typical forms of embodiment of the present invention, it will be readily understood by those conversant with the art that various modifications and changes may be brought thereto without departing from the basic principles of the invention as set forth in the appended claims.

What is claimed as new is:

1. A pick-up device for detecting the movement of a scale assembly movable member of an apparatus for accurately measuring the specific fuel consumption of internal combustion engines, said device comprising:
    a moveable member;
    generating means connected to said movable member for generating signals of which the frequency is a function of the position of said movable member, said generating means comprising a transistor oscillator circuit having an inductance-capacitance tuned circuit cooperating with said movable member to vary one of the elements of said tuned circuit;
    a first impedance changer circuit connected to the output of said oscillator circuit;
    a crystal filter connected to the output of said first impedance changer circuit;
    a second impedance changer circuit connected to the output of said crystal filter;
    amplifying means connected to the output of said second impedance changer for amplifying the portion of the signals generated by said oscillator circuit which are passed through said crystal filter;
    rectifying and doubling means connected to the output of said amplifying means for rectifying the output signal of said amplifying means and doubling the voltage of the rectifier output signal; and
    signal shaping means connected to the output of said rectifying and doubling means for shaping the output signal thereof into a low impedance high amplitude signal.

2. The device of claim 1, wherein said inductance-capacitance tuned circuit comprises an inductance member having first and second coils spaced apart from each other, said movable member being movable into and out of the space defined between said first and second coils, wherein the inductance of said inductance member changes proportionally to the movement of said movable member into and out of said space.

* * * * *